United States Patent
Strothmann

(10) Patent No.: US 9,257,924 B2
(45) Date of Patent: Feb. 9, 2016

(54) METHOD FOR DETERMINING THE ROTARY POSITION OF THE ROTOR OF AN ELECTRIC MACHINE

(76) Inventor: Rolf Strothmann, Saarbrücken (DE)

( * ) Notice: Subject to any disclaimer, the term of this patent is extended or adjusted under 35 U.S.C. 154(b) by 148 days.

(21) Appl. No.: 14/131,978

(22) PCT Filed: Apr. 13, 2012

(86) PCT No.: PCT/DE2012/100103
§ 371 (c)(1),
(2), (4) Date: Jan. 10, 2014

(87) PCT Pub. No.: WO2013/007246
PCT Pub. Date: Jan. 17, 2013

(65) Prior Publication Data
US 2014/0145659 A1    May 29, 2014

(30) Foreign Application Priority Data

Jul. 13, 2011    (DE) .......................... 10 2011 051 793

(51) Int. Cl.
*H02P 1/04* (2006.01)
*H02P 6/18* (2006.01)
*H02K 29/00* (2006.01)

(52) U.S. Cl.
CPC ............... *H02P 6/185* (2013.01); *H02K 29/00* (2013.01); *H02P 6/18* (2013.01); *H02P 6/187* (2013.01)

(58) Field of Classification Search
CPC ............ H02P 6/185; H02P 6/18; H02K 29/00
USPC ............... 318/400.33, 400.3, 400.01, 400.32, 318/400.36
See application file for complete search history.

(56) References Cited

U.S. PATENT DOCUMENTS

| | | | |
|---|---|---|---|
| 5,159,246 A * | 10/1992 | Ueki | 318/400.06 |
| 5,254,914 A * | 10/1993 | Dunfield et al. | 318/400.34 |
| 5,804,939 A | 9/1998 | Yamai et al. | |
| 6,366,037 B1 | 4/2002 | Strothmann | |
| 2006/0006833 A1 | 1/2006 | Koczara et al. | |
| 2006/0028161 A1 | 2/2006 | Yamamoto et al. | |

FOREIGN PATENT DOCUMENTS

EP    1005716 B1    11/2001

* cited by examiner

*Primary Examiner* — Rita Leykin
(74) *Attorney, Agent, or Firm* — Lucas & Mercanti, LLP; Klaus P. Stoffel

(57) ABSTRACT

A method for determining the rotary position of the rotor of an electric machine, which includes star-connected phase conductors, wherein a measurement signal representing the rotary position of the rotor within a magnetic half-period is determined from the potential at the star point. At a measurement time a specified voltage is applied to the ends of all the phase conductors by forcing the star point to a specific potential. At a time following the measurement time a voltage that deviates from the specified voltage is applied to the ends of one of the phase conductors. Then the measurement signal is derived from the current that develops from the measurement time in a connection of the star point to the specified potential.

11 Claims, 2 Drawing Sheets

METHOD FOR DETERMINING THE ROTARY POSITION OF THE ROTOR OF AN ELECTRIC MACHINE

TITLE OF THE INVENTION

The present application is a 371 of International application PCT/DE2012/100103, filed Apr. 13, 2012, which claims priority of DE 10 2011 051 793.6, filed Jul. 13, 2011, the priority of these applications is hereby claimed and these applications are incorporated herein by reference.

BACKGROUND OF THE INVENTION

The invention pertains to a method for determining the rotational position of the rotor of an electric machine comprising star-connected phase conductors, wherein a measurement signal (M) representative of the rotational position of the rotor within a magnetic half-period is acquired.

A method of this type is known from EP 1 005 716 B1. According to this known method, the rotational position of the rotor is determined on the basis of the dependence of the inductances of the phase conductors on the position of the rotor; this is possible because the inductances vary with the changing degrees of saturation of the pole winding cores and the changing geometric influences of the rotor's rotational position. Within a magnetic half-period, there is therefore a unique relationship between the inductances of the phase conductors and the rotor's rotational position. Acquiring a measurement signal (M) representative of the inductance of one or more phase conductors and thus of the rotor's rotational position can be made more difficult, however, by inductive couplings between the phase conductors.

SUMMARY OF THE INVENTION

The invention is based on the goal of creating a new method of the type described above in which the interfering influence of coupling inductances during the acquisition of the measurement signal (M) is reduced.

The inventive method which achieves this goal is characterized in that, at a measurement time ($t_0$), a specified voltage is applied to the ends of all the phase conductors, forcing the star point to assume a specified potential; in that, at a time ($t_1$) following the measurement time ($t_0$), a voltage different from the specified voltage is applied to the ends of one of the phase conductors; and in that the measurement signal (M) is derived from the current (I) which develops between the measurement time ($t_0$) and a point beyond the following time ($t_1$) in the connection used to force the star point to the specified potential.

Immediately after the measurement time ($t_0$), no current is flowing in the connection forcing the star point to the specified potential, because the sum of the currents flowing to and from the star point is still equal to zero during this phase as well. Depending on whether, at the measurement time ($t_0$), the potential at the star point was different from the specified potential or not, a current begins to flow in the connection after the measurement time ($t_0$). Because, at the time ($t_1$) following the measurement time ($t_0$), the voltage across only one of the phase conductors is changed, whereas the voltage across the other phase conductors remains the same, only the inductance and the resistance of this one phase conductor play a role with respect to the further development of the current (I) in the connection. Changes in the current in this phase conductor do not also lead to current changes in the other phase conductors. Inductive couplings between the inductances of the phase conductors therefore have only a minor effect on the development of the current (I) in the connection.

When the inventive method is carried out, it is possible, for example, for all of the phase conductors to be connected to the point of zero potential at measurement time ($t_0$) and for one of the phase conductors to be connected to a direct voltage ($U_B$) at the following time ($t_1$).

It is convenient for this direct voltage to be the operating voltage used during operation of the electric machine by pulse-width modulation.

The rise in current (I) over time (t) is preferably determined, wherein in particular what serves as the measurement signal (M) is the difference between the rise which starts at time ($t_1$) following the measurement time ($t_0$) and the rise which starts at the measurement time ($t_0$).

It is convenient to determine the rise during a phase in which the current (I) is still rising in linear fashion.

The star point potential at the measurement time ($t_0$) is preferably forced to the potential zero point. To force the star point potential to a specified potential, in particular the potential zero point, a connection to the specified potential is established by way of a measuring resistor.

It is appropriate for the star point to be released again immediately after the rise values have been determined, that is, for the connection to be broken.

It is obvious that the difference between the following time ($t_1$) and the measurement time ($t_0$) will be selected so that it is small in comparison to the duration of the pulse cycles of the pulse-width modulation, so that the determination of the rotational position will not interfere with the operation of the electrical machine.

The invention is explained in greater detail below on the basis of the attached drawings:

DETAILED DESCRIPTION OF THE INVENTION

Figure 1:
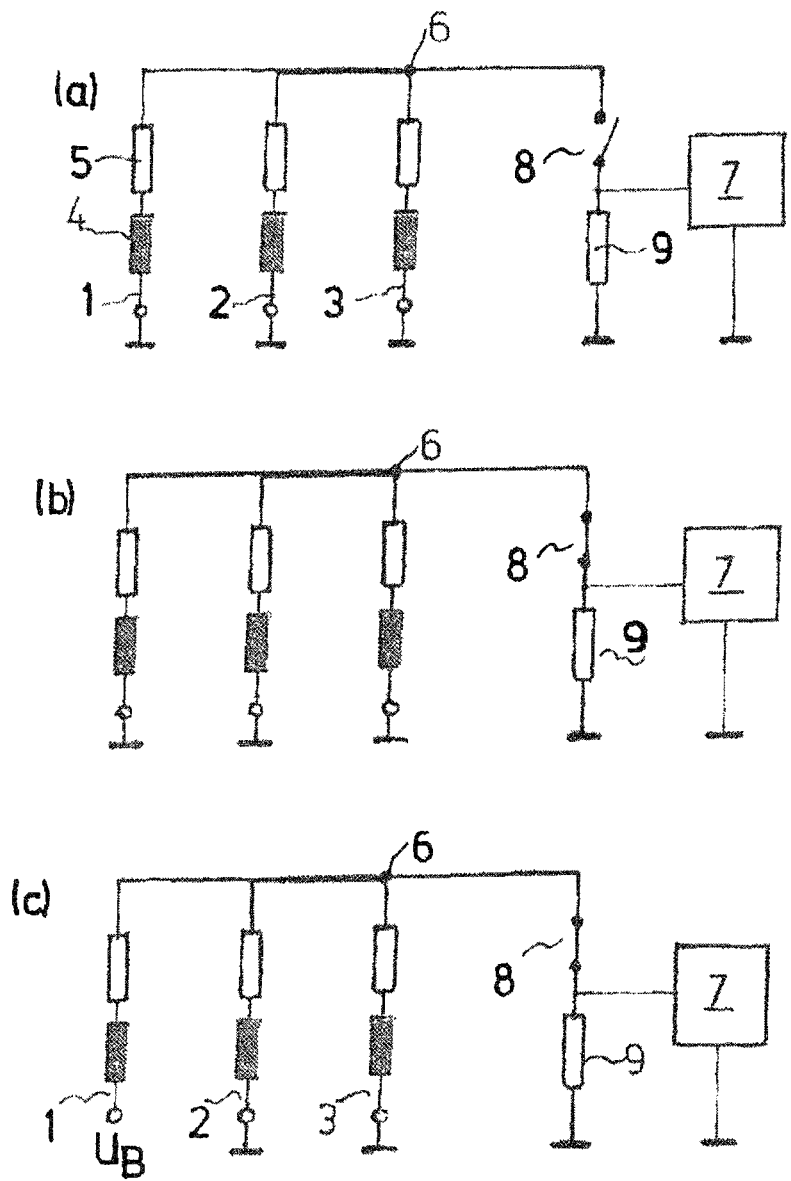
FIG. 1 shows a schematic diagram of a star-connected electric machine with devices for forcing the star point to a specified potential.

An electric machine comprises three star-connected phase conductors 1, 2, and 3, each of which comprises an inductance 4 and an ohmic resistance 5.

The star point 6 of the electric machine (not otherwise shown) can be connected to the voltage zero point by a switch 8 and a resistor 9. A device 7 serves to detect and evaluate a voltage $U_M$ dropping across the measuring resistor 9.

The terminals of the phase conductors 1, 2, 3 can be connected in alternation to an operating voltage $U_B$ or to the voltage zero point so that, for example, the electric machine can be operated by pulse-width modulation.

Whereas the ohmic resistances 5 of the phase conductors 1, 2, 3 are constant regardless of the rotational position of the rotor, the inductances 4, as a result of the changes in magnetic saturation caused by the excitation field and as a result of the changing geometric influences, depend uniquely on the rotor's rotational position within each magnetic half-period.

To determine the rotational position of the rotor, possibly during the operation of the electrical machine by pulse-width modulation, the first step is to establish the connected state shown in FIG. 1a, for example, in which all three phase conductors 1, 2, 3 are connected to the voltage zero point. At the star point 6, a certain potential is present, which originates from the induced and self-induced voltages in the phase conductors. In the next step, the star point 6 is connected via the resistor 9 according to FIG. 1b to the voltage zero point at a measuring time $t_0$ by actuation of the switch 8, and by means of this switching step the potential at the star point is drawn to the voltage zero point. The switching step just mentioned also triggers the detection and evaluation, by the device 7, of the voltage drop $U_M$ generated by the current I now rising across the measuring resistor 9.

As a result of induction and self-induction, currents with different signs are flowing in the phase conductors 1, 2, 3 connected to the voltage zero point and the star point 6, the sum of these currents being equal to zero. This is still true even immediately after the switch 8 is closed. The factors which are important with respect to the rise of the current I, i.e., of the measurement voltage $U_M$ generated across the measuring resistor 9 by the current I after the switch 8 is closed, are not only the currents and induced voltages flowing in the phase conductors 1, 2, 3 at switch-closing time but also the parallel-connected inductances 4 and resistances 5 of the phase conductors 1, 2, 3. These variables determine the time constant for the rise of the current I, i.e., of the measurement voltage $U_M$, over time t up to a saturation value. According to FIG. 2, the device 7 detects the rise ($\Delta U_{M0}/\Delta t_0$) of the voltage $U_M$ over time t, preferably during a phase 10 in which the rise is still linear.

Figure 2:
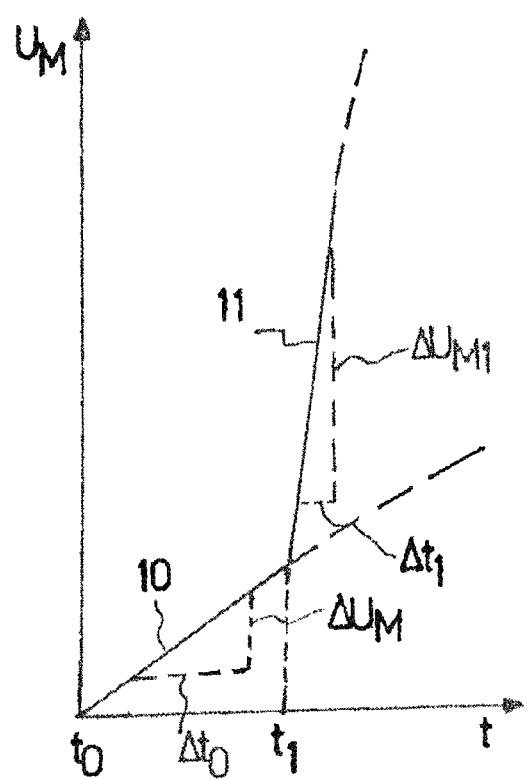
FIG. 2 shows a diagram explaining the acquisition of the measurement signal (M), which depends on the rotational position of the rotor.

As shown in FIG. 1c, the operating voltage $U_B$ is applied at time $t_1$ to the phase conductor 1, for example, during the phase 10 of linear rise. As FIG. 2 shows, this change in the connected state leads to a change in the rise ($\Delta U_{M1}/\Delta t_1$) of voltage $U_M$ over time t.

The factors which determine the change in the rise value, which the device 7 determines during a linear rise phase 11, are essentially the inductance 4, which depends on the rotational position of the rotor; the resistance 5 of phase conductor 1, which is constant from phase conductor to phase conductor; and the rise during the preceding rise phase 10.

The device 7 for detecting and evaluating the measurement voltage $U_M$ determines the difference between the two rises (($\Delta U_{M1}/\Delta t_1$)–($\Delta U_{M0}/\Delta t_0$), and it is this difference which serves as the measurement signal M, which depends on the rotational position of the rotor.

Immediately after the determination of the two rises, the star point 6 is released again by the opening of the switch 8. The measuring period $t_1-t_0$ is short in comparison to the duration of the cycles of the pulse-width modulation, so that the operation of the electric machine is not disturbed in any way by the rotational position determination described above.

The invention claimed is:

1. A method for determining rotational position of the rotor of an electric machine having star-connected phase conductors, wherein a measurement signal representative of the rotational position of the rotor within a magnetic half-period is acquired, the method comprising the steps of:
 applying a specified voltage at a measurement time point to ends of all of the phase conductors while the star point is forced to a specified potential;
 applying, at a time following the measurement time, a voltage different from the specified voltage to the ends of one of the phase conductors; and
 deriving the measurement signal from current that develops between the measurement time and the following time and after the following time at a connection forcing the star point to the specified potential.

2. The method according to claim 1, including determining a rise in the current over time to derive the measurement signal.

3. The method according to claim 1, including determining a rise in the current which starts from the measurement time and a rise which starts from the following time to derive the measurement signal.

4. The method according to claim 3, including determining a difference between the two rise values as the measurement signal.

5. The method according to claim 2, including determining the rise value during a phase in which the rise in the current is still linear.

6. The method according to claim 1, including determining the star point potential to a potential zero point at the measurement time.

7. The method according to claim 1, wherein all of the phase conductors are connected to a potential zero point at the measurement time and a direct voltage is applied to one of the phase conductors at the following time.

8. The method according to claim 7, wherein the direct voltage is an operating voltage used to operate the electric machine by pulse-width modulation.

9. The method according to claim 2, wherein a device that forces the star point to the specified potential is interrupted after determination of the rise value.

10. The method according to claim 1, wherein the star point potential is drawn to the specified potential by way of a connection comprising a measuring resistor.

11. The method according to claim 8, wherein a time difference between the following time and the measurement time is selected so that it is small in comparison to a duration of the pulse cycles.

\* \* \* \* \*